(12) United States Patent
Tan et al.

(10) Patent No.: US 8,065,534 B2
(45) Date of Patent: Nov. 22, 2011

(54) OBFUSCATED STATE STORE FOR RIGHTS MANAGEMENT SYSTEM AND THE LIKE

(75) Inventors: Xiaoxi Tan, Issaquah, WA (US); Caglar Gunyakti, Sammamish, WA (US); Yue Liu, Issaquah, WA (US); Karan S. Dhillon, Bellevue, WA (US); Kristian E. Hatlelid, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 2 days.

(21) Appl. No.: 12/819,556

(22) Filed: Jun. 21, 2010

(65) Prior Publication Data

US 2010/0257378 A1    Oct. 7, 2010

Related U.S. Application Data

(63) Continuation of application No. 12/235,394, filed on Sep. 22, 2008, now Pat. No. 7,774,623, which is a continuation of application No. 10/706,018, filed on Nov. 12, 2003, now Pat. No. 7,447,917.

(51) Int. Cl.
*H04L 29/06* (2006.01)
*G06F 11/30* (2006.01)
*G06F 1/26* (2006.01)

(52) U.S. Cl. ........ 713/193; 713/153; 713/162; 713/165; 713/187; 726/34

(58) Field of Classification Search .................. 713/153, 713/162, 165, 187, 193, 200–202; 726/34
See application file for complete search history.

(56) References Cited

U.S. PATENT DOCUMENTS

| | | | |
|---|---|---|---|
| 5,081,675 A | 1/1992 | Kittirutsunetorn | |
| 5,095,525 A | 3/1992 | Almgren et al. | |
| 5,123,045 A | 6/1992 | Ostrovsky et al. | |
| 5,943,283 A | 8/1999 | Wong et al. | |
| 6,006,328 A | 12/1999 | Drake | |
| 6,665,210 B1 * | 12/2003 | Harvey | 365/185.03 |
| 6,704,872 B1 | 3/2004 | Okada | |
| 7,155,415 B2 | 12/2006 | Russell et al. | |
| 7,165,076 B2 * | 1/2007 | Bentley | 1/1 |
| 7,447,917 B2 | 11/2008 | Tan et al. | |
| 7,610,295 B2 * | 10/2009 | Pooni et al. | 1/1 |
| 7,729,992 B2 * | 6/2010 | Rose | 705/51 |
| 2003/0163718 A1 | 8/2003 | Johnson et al. | |
| 2005/0069138 A1 | 3/2005 | De Jong | |
| 2009/0031146 A1 | 1/2009 | Tan et al. | |

* cited by examiner

*Primary Examiner* — Mohammad Reza
(74) *Attorney, Agent, or Firm* — Woodcock Washburn LLP

(57) ABSTRACT

A state store having state information therein is stored on a computing device. Information at least nearly unique to the computing device is obtained, and a number of locations at which at least a portion of the state store is to be stored at is determined. Pseudo-random file names and corresponding paths are generated based at least in part on the obtained information, whereby the generated file names and corresponding paths are likewise at least nearly unique to the computing device, and the generated file names and path are paired to form the locations. Thereafter, the state store is stored according to the generated locations.

21 Claims, 5 Drawing Sheets

OBFUSCATED STATE STORE FOR RIGHTS MANAGEMENT SYSTEM AND THE LIKE

CROSS REFERENCE TO RELATED APPLICATIONS

This application is a continuation of application Ser. No. 12/235,394 filed Sep. 22, 2008, the entirety of which is incorporated by reference herein, which is a continuation of Ser. No. 10/706,018, filed Nov. 12, 2003, the entirety of which is incorporated by reference herein.

TECHNICAL FIELD

The present invention relates to an architecture and method for obfuscating a state store having state information in connection with a rights management system. More particularly, the present invention relates to such an architecture and method whereby the state store is stored at one or more seemingly random locations that vary from computing device to computing device.

BACKGROUND OF THE INVENTION

As is known, and referring now to FIG. 1, a rights management (RM) and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14, a portable playback device or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. An RM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based RM system 10 allows an owner of digital content 12 to specify rules that must be satisfied before such digital content 12 is allowed to be rendered. Such rules can include the aforementioned requirements and/or others, and may be embodied within a digital license 16 that the user/user's computing device 14 (hereinafter, such terms are interchangeable unless circumstances require otherwise) must obtain from the content owner or an agent thereof, or such rules may already be attached to the content 12. Such license 16 may for example include the decryption key (KD) for decrypting the digital content 12, perhaps encrypted according to another key decryptable by the user's computing device or other playback device. Because the content 12 can only be rendered in accordance with the rules in the license 16, then, the content 12 may be freely distributed.

The content owner for a piece of digital content 12 would prefer not to distribute the content 12 to the user unless such owner can trust that the user will abide by the rules specified by such content owner in the license 16 or elsewhere. Preferably, then, the user's computing device 14 or other playback device is provided with a trusted component or mechanism 18 that will not render the digital content 12 except according to such rules.

The trusted component 18 typically has an evaluator 20 that reviews the rules, and determines based on the reviewed rules whether the requesting user has the right to render the requested digital content 12 in the manner sought, among other things. As should be understood, the evaluator 20 is trusted in the DRM system 10 to carry out the wishes of the owner of the digital content 12 according to the rules, and the user should not be able to easily alter such trusted component 18 and/or the evaluator 20 for any purpose, nefarious or otherwise.

As should be understood, the rules for rendering the content 12 can specify whether the user has rights to so render based on any of several factors, including who the user is, where the user is located, what type of computing device 14 or other playback device the user is using, what rendering application is calling the RM system 10, the date, the time, etc. In addition, the rules may limit rendering to a pre-determined number of plays, or pre-determined play time, for example.

The rules may be specified according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the evaluator 20 determining that the user satisfies the rules, the digital content 12 can then be rendered. In particular, to render the content 12, the decryption key (KD) is obtained from a pre-defined source and is applied to (KD (CONTENT)) from the content package 13 to result in the actual content 12, and the actual content 12 is then in fact rendered.

Particularly with regard to the aforementioned rules, it is oftentimes necessary for an RM system 10 to maintain on the computing device 14 a state store 22 having therein state information relating to the usage of a particular license 16. For example, if a license 16 includes a rule specifying that associated content 12 can be rendered only 10 times, then the number of renderings must be stored in the state store 22 and incremented after each rendering, even if such renderings take place across multiple use sessions, days, weeks or even longer. Likewise, if a license 16 includes a rule specifying that associated content 12 can be rendered for only a set number of days after a first rendering, then the first date of rendering must be stored in the state store 22 for reference by the license evaluator 20 when such evaluator 20 is evaluating the license 16. Of course, other examples of state information that may be stored in the state store 22 are many and varied, and it is to be recognized that the present invention as set forth below is not limited to any particular type of state information stored in the state store 22.

Note that a nefarious entity attempting to avoid a rule in a license 16 may attempt to alter the state information pertaining thereto as stored in the state store 22. For example, and with regard to the aforementioned license 16 that includes a rule specifying that associated content 12 can be rendered only 10 times, the nefarious entity may attempt to alter the associated number of renderings as stored in the state store 22, or may even attempt to delete the state store 22 entirely. Likewise, and with regard to the license 16 that includes a rule specifying that associated content 12 can be rendered for only a set number of days after a first rendering, the nefarious entity may attempt to alter the first date of rendering as stored in the state store 22, or again may even attempt to delete the state store 22 entirely.

Many schemes are known to defeat attempts by a nefarious entity to modify the state store 22. For example, the state store 22 may be encrypted and/or may include a verifying signature or hash. However, it is more problematic to prevent a nefarious entity from deleting the state store 22 in its entirety.

Accordingly, a need exists for an architecture and method that hides the state store 22 by storing same in one or more seemingly random locations. Moreover, a need exists for such an architecture and method that stores the state store 22 in such one or more seemingly random locations that vary from computing device 14 to computing device 14. Further, a need exists for such an architecture and method that stores the state store 22 in a retrievable manner.

SUMMARY OF THE INVENTION

The aforementioned needs are satisfied at least in part by the present invention in which a system is disclosed for storing a state store having state information therein on a computing device. Information at least nearly unique to the computing device is obtained, and a number of locations at which at least a portion of the state store is to be stored at is determined. Pseudo-random file names and corresponding paths are generated based at least in part on the obtained information, whereby the generated file names and corresponding paths are likewise at least nearly unique to the computing device, and the generated file names and path are paired to form the locations. Thereafter, the state store is stored according to the generated locations.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
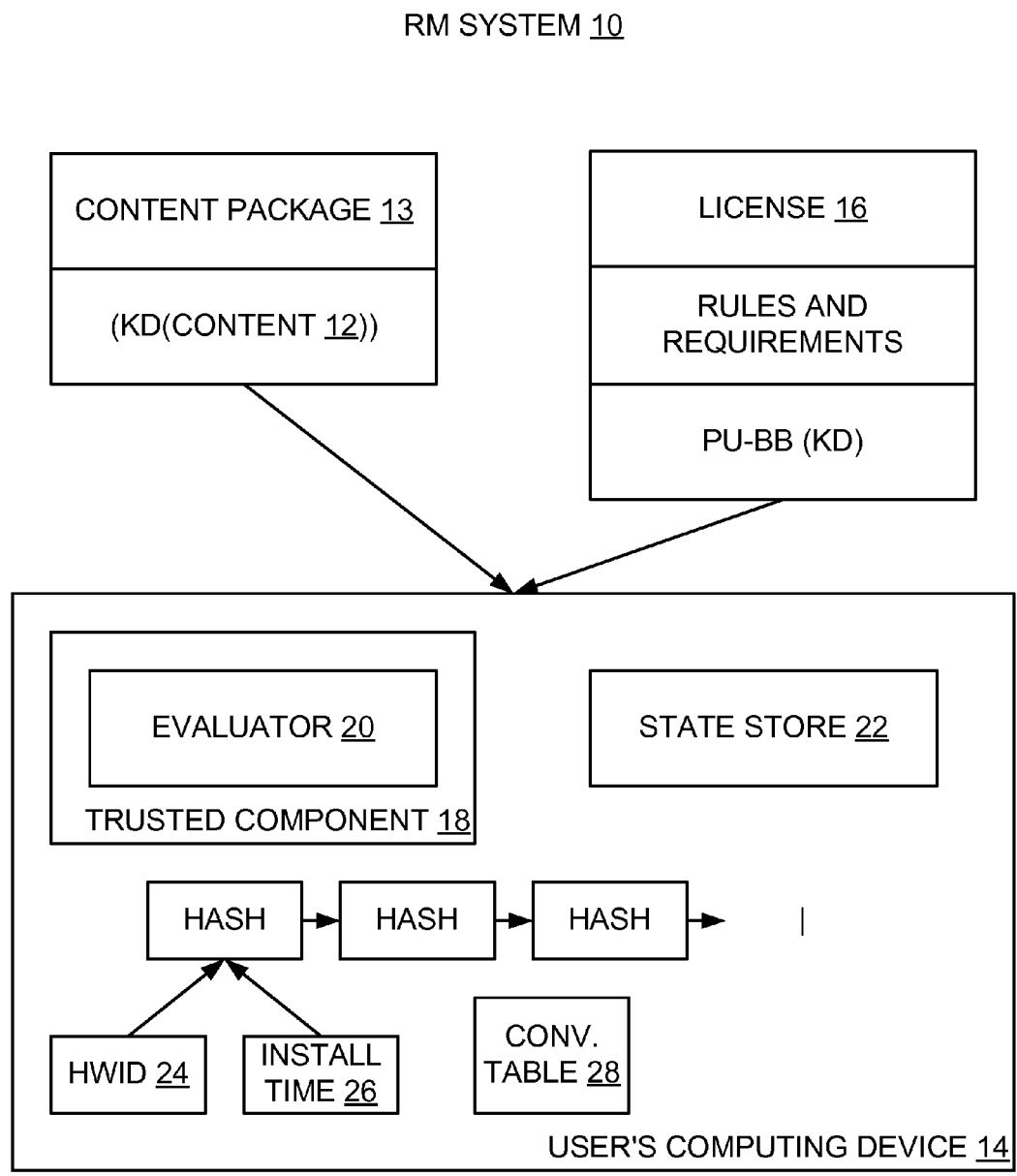
FIG. 1 is a block diagram showing an enforcement architecture of an example of a trust-based system, including a state store.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Figure 2:
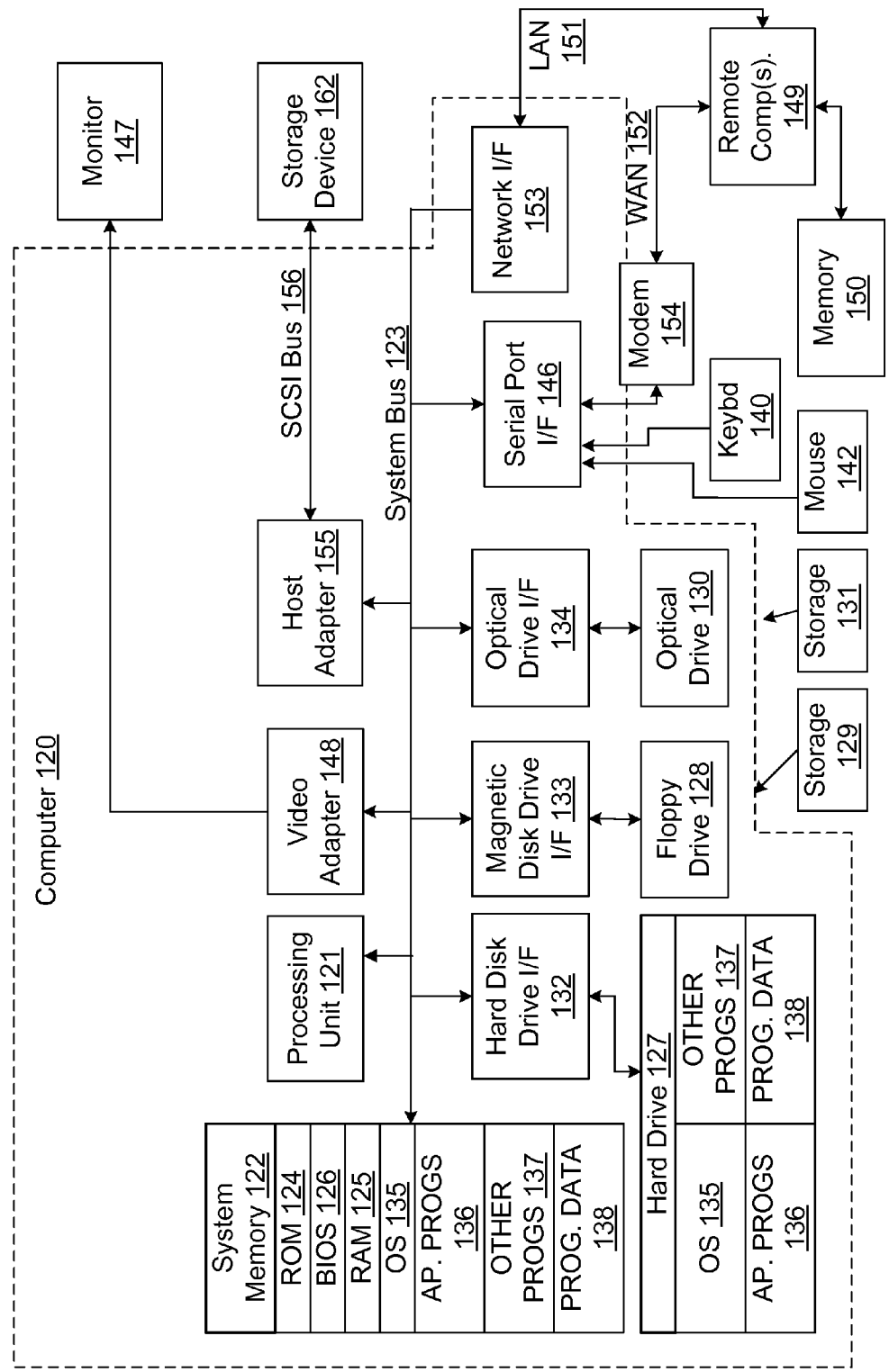
FIG. 2 is a block diagram representing a general purpose computer system in which aspects of the present invention and/or portions thereof may be incorporated.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Obfuscating the State Store

In the present invention, a state store 22 with state information is stored in a seemingly random manner in a persistent store on a computing device 14. Such persistent store is typically a hard drive but may also be other forms of persistent storage without departing from the spirit and scope of the present invention. For example, the persistent store may be any optical or magnetic storage device, a persistent RAM, or the like.

Generally, in the present invention, a method as set forth below employs both machine hardware attributes and operating system attributes to generate names unique from computing device 14 to computing device 14 and/or from install time to install time. Thus, if a nefarious entity should discover the state store 22 on one computing device 14, such discovery cannot be easily reproduced on another computing device 14. Moreover, a nefarious entity having discovered the state store 22 on one computing device 14 cannot re-locate same to another computing device 14 because the another computing device 14 does not have access to the attributes that generated the location of the state store 22.

In one embodiment of the present invention, and as seen in FIG. 1, the computing device 14 includes thereon a hardware identification (HWID) 24 and an install time 26 at which an element such as the operating system was installed on the computing device 14, where each of the HWID 24 and the install time 26 are either stored in a known location or derivable in a known manner. Typically, each of the HWID 24 and the install time 26 is universally unique or near-unique, and the combination of the HWID 24 and the install time 26 is likewise universally unique or near-unique.

As should be appreciated, the HWID 24 for any particular computing device 14 is derived from one or more attributes uniquely or nearly uniquely imparted to one or more particular hardware elements of the computing device 14 and software readable from such elements. For example, the HWID 24 for a computing device 14 may be based on a known reproducible combination of one or more of the serial number of the hard drive of the computing device 14, the serial number of the network interface card of the computing device 14, the serial number of the video card of the computing device 14, the serial number of the BIOS of the computing device 14, etc. Reproducibly generating a HWID 24 of a computing device 14 is generally known or should be apparent to the relevant public and therefore need not be described herein in any detail. Therefore, any appropriate method for reproducibly generating a HWID 24 for a computing device 14 may be employed without departing from the spirit and scope of the present invention.

As should also be appreciated, the install time 26 is the time during which a particular element such as the operating system was installed on the computing device 14. The install time for the operating system is particularly attractive inasmuch as such information is typically stored in a specific protected location on the computing device 14 and software-readable from such location. The protection of the install time 26 is typically such that the install time 26 cannot be deleted or modified. Reading the install time 26 from a computing device 14 is generally known or should be apparent to the relevant public and therefore need not be described herein in any detail. Therefore, any appropriate method for reading the install time 26 from a computing device 14 may be employed without departing from the spirit and scope of the present invention.

In one embodiment of the present invention, the combination of the HWID 24 and the install time 26 from a computing device 14 is employed to generate one or more file names that are unique and that appear to be random and one or more corresponding hierarchy paths that appear to be random, where each generated path/file name pair is employed to store at least a portion of the state store 22. Note that the hierarchy locations can exist under a known operating system path such as file system os\system, or any other location such as a registry or the like. Significantly, with multiple generated path/file names, the state store 22 can be dynamically persisted into a single location or split into multiple locations.

Figure 3:
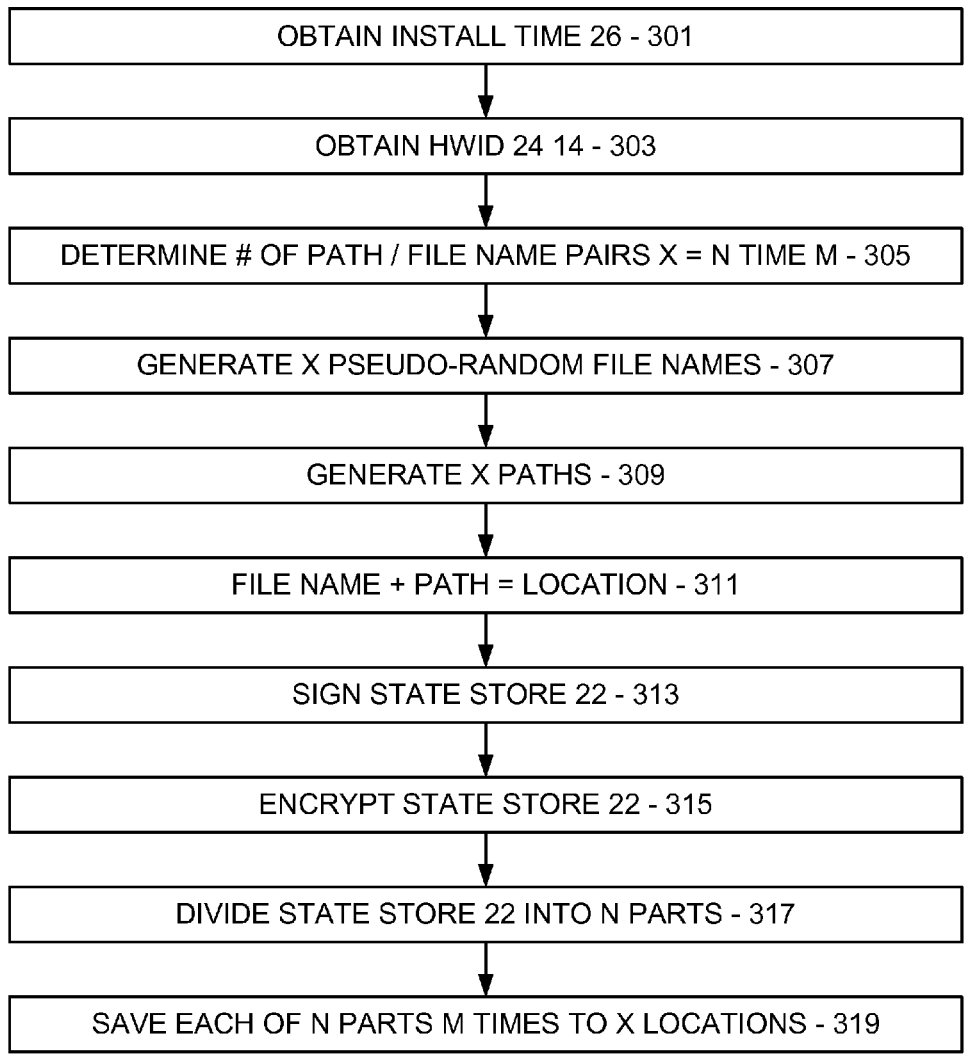
FIG. 3 is a flow diagram showing key steps performed by the architecture of FIG. 1 in storing the state store thereof in one or more seemingly random locations in accordance with one embodiment of the present invention.

In one embodiment of the present invention, and turning now to FIG. 3, a method employed to generate the path/file name pairs is shown. Note that the method may be performed by one or more elements on the computing device 14 of FIG. 1. Such elements may comprise elements dedicated to performing the method of FIG. 3 or functionality within elements that perform multiple functions, all without departing from the spirit and scope of the present invention.

Preliminarily, and as may be appreciated, the process of generating the path/file name pairs begins by obtaining the install time 26 associated with the computing device 14 (step 301) and obtaining the HWID 24 of the computing device 14 (step 303). In addition, the actual number of path/file name pairs is determined (step 305). Note that such number may be set by a user of the computing device 14, may be a default value, or may be chosen based on some other factor without departing from the spirit and scope of the present invention. For instance, it may be the case that a particular license 16 associated with the computing device 14 has a rule specifying a minimum number of locations in which the state store 22 is located.

Note here that it may be the case that a single copy of the state store 22 is to be split into n parts, thus requiring x=n locations, or it may be the case that m identical non-split copies of the state store 22 are required, thus requiring x=m locations. Of course, it may also be the case that m identical copies of the state store 22 are each to be split into n parts, thus requiring x=n times m locations. As may be appreciated, having identical copies of the state store 22 is useful in the event a nefarious entity manages to delete at least one part of one copy, in which case reference may still be made to another copy with all parts available.

Based on the HWID 24, the install time 26, and the number x of locations needed, then, x pseudo-random file names are generated (step 307), and x corresponding paths are also generated (step 309), as will be set forth below in more detail in connection with FIG. 5. Note with regard to file name generation as at step 307 that generating pseudo-random file names could involve generating names having a fixed length or a pseudo-random length, and that each file name could include a pseudo-random extension. However, it may actually be counter-productive to include pseudo-random extensions inasmuch as such pseudo-random extensions may in fact be recognizable based on their pseudo-randomness, especially when viewed in comparison to other extensions that are not random. Accordingly, in one embodiment of the present invention, the generated file names do not include extensions, or include a fixed extension.

Note also with regard to path generation as at step 309 that generating pseudo-random paths may at first blush seem to be reasonable. However, and again, it may actually be counter-productive to use pseudo-random paths inasmuch as such pseudo-random paths may in fact be recognizable based on their pseudo-randomness, especially when viewed in comparison to other paths that are not random. Accordingly, in one embodiment of the present invention, the generated path corresponding to each generated filename is a level of a path already existing on the computing device 14. For example, it may be that a computing device 14 has a hard drive with a system directory:

os\system\mfr\crypto\rsa\machinekeys

In such case, generating a path may comprise pseudo-randomly selecting from among os (level one), os\system (level two), os\system\mfr (level three), os\system\mfr\crypto (level four), os\system\mfr\crypto\rsa (level five), and os\system\mfr\crypto\rsa\machinekeys (level six) as the generated path.

At any rate, the x generated file names of step 307 and the x generated paths of step 309 are correspondingly paired to form the needed x pseudo-random locations (step 311), and the state store 22 is then stored according to such locations. In particular, and in one embodiment of the present invention, the state store 22 is signed based on a cryptographic key that is local to the computing device 14 to produce a signature (step 313). Such signing may be performed according to any appropriate signing algorithm without departing from the spirit and scope of the present invention. In addition, such signing key may be any appropriate signing key without departing from the spirit and scope of the present invention. For example, such signing key may be based in part on a universal key and a first local key derived from the HWID 24 associated with and obtained from the computing device 14. As should be appreciated, the signature is appended to the state store 22 in an appropriate manner and may be employed to ensure the integrity of the state store 22 at some later point, whereby the signature will fail to verify if the state store 22 is altered either nefariously or otherwise.

Thereafter, and in one embodiment of the present invention, the signed state store 22 is encrypted based on a cryptographic key that is local to the computing device 14 to produce an encrypted state store 22 (step 315). Such encryption may be performed according to any appropriate encryption algorithm without departing from the spirit and scope of the present invention. In addition, such encryption key may be any appropriate signing key without departing from the spirit and scope of the present invention. For example, and again, such encryption key may be based in part on a universal key and a second local key derived from the HWID 24 associated with and obtained from the computing device 14. As should be appreciated, encryption is a further step that guards against alteration of the state store 22 either nefariously or otherwise. As such, it is to be appreciated that in certain circumstances either signing as at step 313 or encryption as at step 325 may be omitted while still affording protection against alteration of the state store 22.

At any rate, once signed and/or encrypted, the state store 22 may then be divided into the n parts desired (step 317). Such dividing may be performed according to any appropriate dividing algorithm without departing from the spirit and scope of the present invention. For example, such dividing may be based on a modulo function, especially if the state store 22 is not precisely divisible into equal parts. Conversely, such dividing maybe based on another function that ensures that the state store 22 is divided into emphatically unequal parts so as to increase the appearance of pseudo-randomness.

Once divided into the n parts desired, each of the n parts is then saved m times according to the n times m locations generated as at step 311 (step 319). Note that the parts may be stored to the locations in any appropriate manner without departing from the spirit and scope of the present invention as long as the storing procedure is reproducible in reverse to retrieve the state store 22 from storage. For example, if the locations are generated in a particular order, and the divided state store 22 also appears in a particular order, it may be that the ordered parts of the state store 22 are each applied in order m times to the ordered locations. Of course, variations may be introduced in an effort to further obfuscate the state store 22.

As was alluded to above, at some point the stored state store 22 is to be reconstituted so that state information therein may be retrieved, updated, and/or the like. Accordingly, and turning now to FIG. 4, it is seen that reconstituting the state store 22 begins by again obtaining the install time 26 associated with the computing device 14 (step 401), obtaining the HWID 24 of the computing device 14 (step 403), and determining the actual number x of path/file name pairs at which the state store 22 is stored (step 405). Presumably, such actual number x as well as the number of parts n and the number of copies m is stored on computing device 14 in an appropriate location.

As before, based on the HWID 24, the install time 26, and the number x of locations, which is equal to n times m, then, the same x pseudo-random file names are generated based on the same process as was employed in connection with step 307 (step 407), and the same x corresponding paths are also generated based on the same process as was employed in connection with step 309 (step 409), where such processes are set forth below in more detail in connection with FIG. 5.

The x generated file names of step 407 and the x generated paths of step 409 are again correspondingly paired to form the needed x pseudo-random locations (step 411), and each copy of each part of the state store 22 is then retrieved from such x locations (step 413), presuming such copy has not been moved or deleted. Note that inasmuch as the copies of the parts are stored to the locations in a predetermined manner, it is of course necessary to order the parts and copies appropriately based on the predetermined manner of storage thereof. Of course, if it is found that a copy of a part of the state store 22 is missing from the presumed location thereof, such absence is noted and the corresponding copy of the state store 22 is ignored as being incomplete.

At any rate, each complete copy of the state store 22 is identified and is combined from the n parts thereof to form a reconstituted signed and/or encrypted state store 22 (step 415). As may be appreciated, such combining is performed in a manner corresponding to the manner in which the state store 22 was divided as at step 317. Thereafter, and as necessary, each combined state store 22 is decrypted based on the encrypting cryptographic key or a corresponding key (step 417), and/or the signature of each combined state store 22 is verified based on the signing cryptographic key or a corresponding key (step 419). As may be appreciated, such decrypting is performed in a manner corresponding to the manner in which the state store 22 was encrypted as at step 315, and such verification is performed in a manner corresponding to the manner in which the state store 22 was signed as at step 313.

As may now be appreciated, one of the decrypted and/or verified copies of the state store 22 is now selected and the state information therein is retrieved, updated, modified, and/or the like as necessary. Such modified copy of the state store 22 may then be again stored according to the method set forth in FIG. 3, for late retrieval according to the method set forth in FIG. 4. As should also be appreciate, once a copy of the state store 22 is selected and modified, it maybe prudent to dispense with all other copies so as to avoid multiple inconsistent copies of the state store 22.

Figure 5:
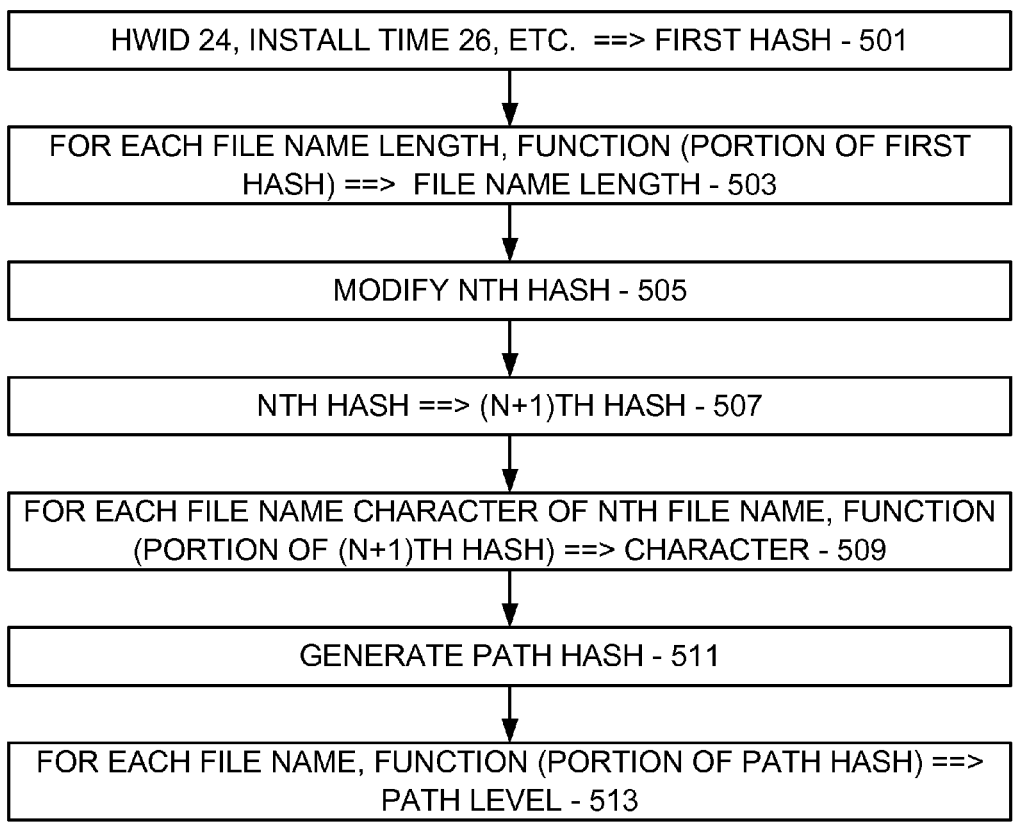
FIG. 5 is a flow diagram showing key steps performed by the architecture of FIG. 1 in generating the file name and path for each location in accordance with one embodiment of the present invention.

Turning now to FIG. 5, and as was alluded to above, a method of reproducibly generating the x file names as at steps 307 and 407 and of reproducibly generating the x corresponding paths as at steps 309 and 409 is shown. Preliminarily, to generate each file name, it is first determined whether each file name is of a fixed length or a variable length. If fixed, the method continues without more, but if variable, a determination of the length of each file name must be made.

Presuming that each file name is to have a variable length, then, and in one embodiment of the present invention, and remembering that the install time 26 associated with the computing device 14 and the HWID 24 of the computing device 14 have been obtained as at steps 301, 303, 401, and 403, such HWID 24, such install time 26 are combined, perhaps with other attributes, and the combination is hashed to produce a first hash comprising a string of numbers (step 501). Hashing such a combination to produce such a string of numbers is known or should be apparent to the relevant public and therefore need not be set forth herein in any detail. Accordingly, any particular hash may be performed without departing from the spirit and scope of the present invention. For example, the hash may be performed to generate a first hash comprising a string of bytes sufficient to represent a length for each of x=n times m file names, where each byte is serially employed to generate a length for a corresponding file name.

With such first hash, then, and for each file name length, a pre-defined serial portion of the first hash is taken up and applied to a function to result in the file name length (step 503). Applying the portion of the first hash to a function to result in the file name length is known or should be apparent to the relevant public and therefore need not be set forth herein in any detail. Accordingly, any particular type of applying may be performed without departing from the spirit and scope of the present invention. For example, if the portion of the first hash is a byte and a minimum and maximum length are preset, each byte value may be applied to the modulo function:

Length=[byte value mod(maximum−minimum)]+minimum.

An example of a first hash and the corresponding file name length for each of a plurality of file names is as follows:

| FILE NAME | 1ST | 2ND | 3RD | etc. |
| --- | --- | --- | --- | --- |
| FIRST HASH (portioned) | 3Dh | 11h | 4Fh | etc. |
| LENGTH | 4 | 7 | 5 | etc. |

Now that the length of each file name has been established, each such file name may in fact be generated. In one embodiment of the present invention, each such file name is developed based on a hash akin to the first hash as at step 501. In one embodiment in particular, to produce the first file name, the first hash is in fact itself hashed to produce a second hash comprising another string of numbers (step 507). Here, and again, the second hash may for example comprise a string of bytes, where each byte is serially employed to generate a character in the file name.

Specifically, with such second hash, for each file name character of the first file name, a pre-defined serial portion of the second hash is taken up and applied to a function to result in the character (step 509). Of course, remembering that the length of the first name was set by way of the first hash as at steps 501 and 503, such second hash is in fact employed to generate a corresponding number of characters. Applying the portion of the second hash to a function to result in a character is known or should be apparent to the relevant public and therefore need not be set forth herein in any detail. Accordingly, any particular type of applying may be performed without departing from the spirit and scope of the present invention. For example, if the portion of the first hash is 6 bits, each G-bit value may be applied to a conversion table 28 pre-defined for the computing device 14, where such conversion table 28 includes a character randomly or pseudo-randomly assigned to every possible 6-bit value:

| 6-BIT VALUE | 000000 | 000001 | 000010 | etc. |
| --- | --- | --- | --- | --- |
| CHAR. | Z | 7 | N | etc. |

An example of a second hash and the corresponding first file name of length 3 is as follows:

| | SECOND HASH (portioned) | | | |
| --- | --- | --- | --- | --- |
| | 011011 | 110101 | 100010 | etc. |
| CHAR. | R | 3 | Q | |

Note that prior to producing the second hash as at step 507, it may be advisable to modify the first hash in an effort to further obfuscate and pseudo-randomize the first file name (step 505). Such modification may of course be any reproducible modification without departing from the spirit and scope of the present invention. For example, such modification may comprise a bit shift or byte shift of pre-determined length, a reverse ordering of bits or bytes, a swapping of adjacent bits or bytes, and the like. Significantly, and again, the modification if in fact performed should be of a type that is reproducible so that the set of file names generated to store a state store 22 as in FIG. 3 is the same set of file names generated to retrieve the stored state store 22 as in FIG. 4.

As should now be appreciated, to produce the second file name and each subsequent file name thereafter, the process as at steps 505-509 is repeated. In particular, to produce an Nth file name, the Nth hash is modified if desired as at step 505 and the modified Nth hash is in fact itself hashed to produce an (N+1)th hash comprising another string of numbers as at step 507. Thereafter, with such (N+1)th hash, for each file name character of the Nth file name, a pre-defined serial portion of the (N+1)th hash is taken up and applied to a function to result in the character as at step 509. Of course, and again, it is to be remembered that the length of the Nth name was set by way of the first hash as at steps 501 and 503, and therefore the (N+1)th hash is in fact employed to generate a corresponding number of characters.

Of course, in addition to generating the file names, the corresponding paths must also be generated to fully define each location. In one embodiment of the present invention, and as was set forth above, the corresponding paths are selected from among a number of levels of a path already existing on the computing device 14. For example, it may be that a computing device 14 has a hard drive with a system directory A\B\C, whereby three levels are available as the generated path: A (level 1), A\B (level 2), and A\B\C (level 3).

In one embodiment of the present invention, then, and similar to the process as set forth above as at steeps 501 and 503, to select the level/path for each file name, a path hash is generated to comprise a string of numbers (step 511). Note here that the path hash maybe independent of all other hashes, may be based on the obtained HWID 24 and the obtained install time 26, may be derived from another already-produced hash, and/or may be the initial hash from which all other hashes are derived, all without departing from the spirit and scope of the present invention.

Significantly, the path hash as generated comprises a string of bytes sufficient to represent a level for each of x=n times m file names, where for example each half-byte of the path hash is serially employed to generate a level for a corresponding file name. With such path hash, then, and for each file name, a pre-defined serial portion of the path hash is taken up and applied to a function to result in the level corresponding to the file name (step 513). Applying the portion of the path hash to a function to result in the file name length is, again, known or should be apparent to the relevant public and therefore need not be set forth herein in any detail. Accordingly, any particular type of applying may be performed without departing from the spirit and scope of the present invention. For example, if the portion of the first hash is a half-byte and a minimum and maximum level are preset, each half-byte value may be applied to the modulo function:

Level=[half-byte value mod(maximum−minimum)]+minimum.

An example of a path hash and the corresponding level for each of a plurality of file names is as follows:

| FILE NAME | 1ST | $2^{ND}$ | 3RD | etc. |
|---|---|---|---|---|
| PATH HASH (portioned) | 1101 | 0111 | 1001 | etc. |
| LEVEL | 1 | 3 | 2 | etc. |

To summarize, then, based on multiple hashes that derive from the HWID 24 and the install time 26 of the computing device 14, x=n times m locations may be reproducibly generated as including a file name of predetermined length and a predetermined path comprising a level of an already existing system path.

Note that inasmuch as the generated locations are based on the HWID 24 of the computing device 14, any change in the HWID 24 will change the locations. As should be understood, such change in the HWID 24 may occur if for example the HWID 24 is based at least in part on a serial number of a hard drive of the computing device 14 and such hard drive is replaced. Accordingly, in one embodiment of the present invention, a special location is generated based not on the HWID 24 but on each of one or more secondary IDs, such as the serial number of the video card, the serial number of the processor, etc, and at each special location is stored the (old) HWID 24 and the secondary ID corresponding to such special location. Thus, if the (presumably new) HWID 24 fails to properly generate the locations of the state store 22, each secondary ID is employed in place of the (new) HWID 24 in an attempt to generate the corresponding special location, and if in fact the special location is found, a check is made of whether the secondary ID therein matches the secondary ID employed. If so, the (old) HWID 24 in the special location is employed to properly generate the locations of the state store 22. In addition, the (new) HWID 24 is employed henceforth to save the state store 22, and each special location is updated to store the (new) HWID therein.

Note, too, that it may be advisable to shift the locations of the state store 22 on a periodic basis, such as for example weekly or daily. To do so, the hashes used to derive the locations should be based not only on the HWID 24 and the install time 26 but on a period identifier, such as a week identifier or a day identifier. Of course, doing so requires that the period identifier employed to currently store the state store 22 be stored, and that such stored period identifier be updated as appropriate each time the state store 22 is newly stored.

Figure 4:
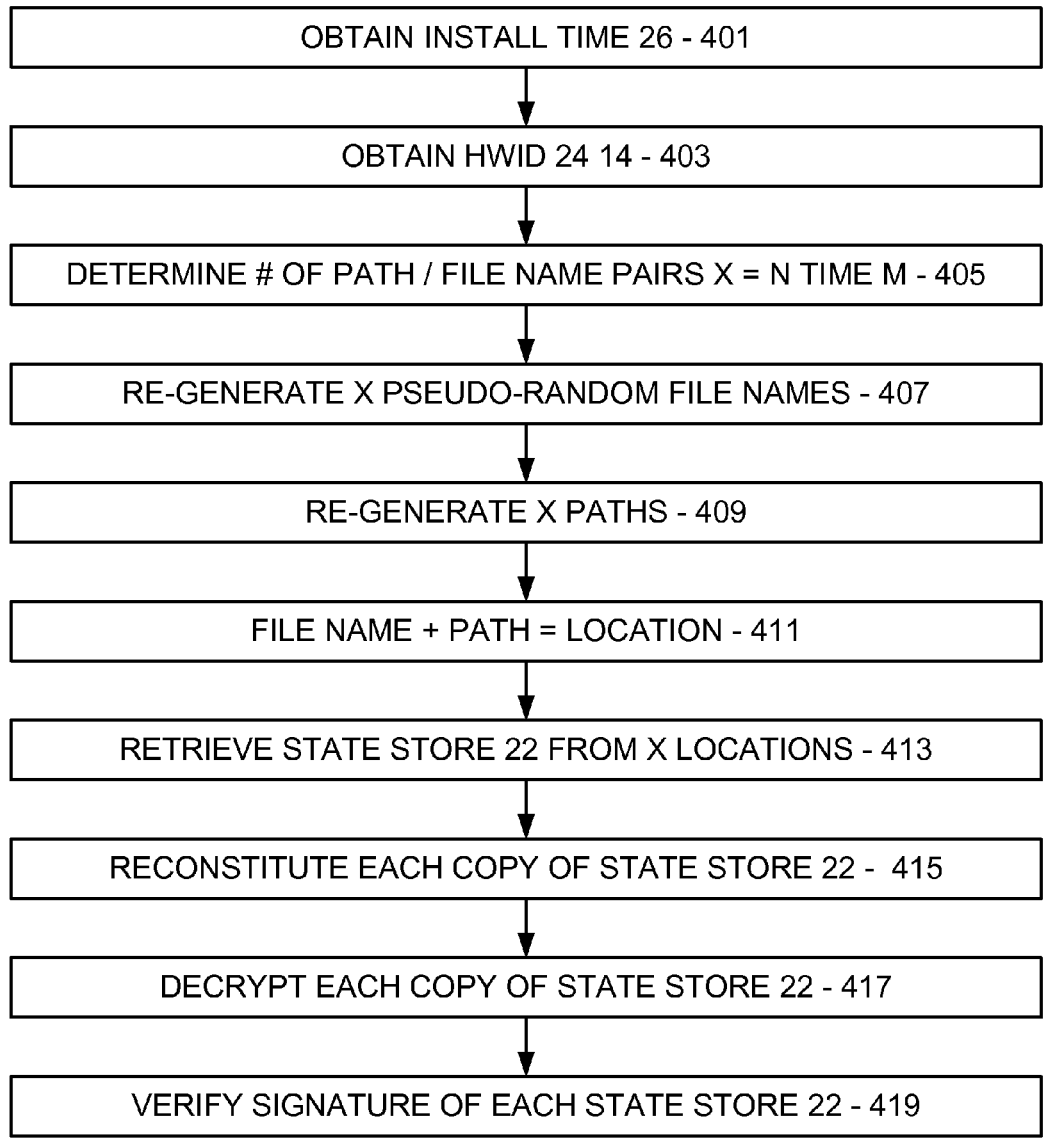
FIG. 4 is a flow diagram showing key steps performed by the architecture of FIG. 1 in retrieving the state store thereof from the one or more seemingly random locations in accordance with one embodiment of the present invention.

Note, further, that if m copies of the state store are maintained, it may be advisable to randomly or pseudo-randomly select one of the reconstituted copies after step 419 of FIG. 4. This is especially true if the copies are not protected by a signature or encryption, in which case a nefarious entity who modifies one copy cannot ensure that the modified copy is selected. Instead, such nefarious entity must modify all copies, which is of course a much more difficult task.

Conclusion

The present invention may be practiced with regard to any appropriate state store 22 or even multiple such state stores, presuming that each such state store is individually identified and that such identification is a basis for the hashes therefor. Moreover, the present invention is not restricted to use in connection with state stores 22 storing state information in connection with a right management system 10, but instead may be used in connection with state stores 22 storing state information in connection with any type of system. Accordingly, the present invention is to be interpreted to encompass any number and type of state store 22 stored on a computing device 14, in however many copies and however many parts.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful architecture and method that hides the state store 22 by storing same in one or more seemingly random locations. Such one or more seemingly random locations are derived in part from a HWID 24 of the computing device 14 upon which the state store 22 resides, and therefore such locations vary from computing device 14 to computing device 14. Nevertheless, the state store 22 as stored on the computing device 14 may be retrieved therefrom.

It should be appreciated that changes could be made to the embodiments described above without departing from the inventive concepts thereof. For example, although the HWID 24 is described herein as being derived from hardware attributes, such HWID can also be derived from other computing environment attributes without departing from the spirit and scope of the present invention. For example, HWID 24 can be contributed from a domain name to which the computing device 14 joins, or other network attributes. Moreover, although described in connection with an RM system 10 having protected content 12, it is to be realized that the present invention may be employed with other systems having a state store 22, where such other systems use other kinds of data, including software, programs digital data, etc. Further, although described primarily in terms of storing the state store 22 in a file system, such state store 22 may also be stored in other types of storage locations including a registry, existing files or registry locations in alternate streams, bitmaps, sounds, etc.

It should be understood, therefore, that this invention is not limited to the particular embodiments disclosed, but it is intended to cover modifications within the spirit and scope of the present invention as defined by the appended claims.

What is claimed:

1. A system of storing a state store on a computing device, the system comprising:
    a computer processor;
    a computing memory communicatively coupled to the processor, wherein when the processor executes using the memory the following steps occur:
    obtaining information from the computing device unique with regard to the computing device, the obtained information being selected from a group consisting of a hardware identification (HWID) generated for the computing device based on one or more identifications of hardware of the computing device, and a specific time associated with the computing device;
    generating a specific number of locations on the computing device at which at least a portion of the state store is to be stored;
    generating the specific number of pseudo-random file names and the specific number of corresponding paths based at least in part on the obtained information by applying a one-way hash function to data including the obtained information and employing a resulting output of the function to define the file names and the paths, wherein the generated file names and corresponding paths are unique to the computing device;
    pairing respective ones of the specific number of generated file names and the specific number of generated paths to form the specific number of locations on the computing device; and
    storing the state store on the computing device according to the specific number of generated locations on the computing device.

2. The system of claim 1 comprising at least one subsystem for obtaining information specific to the computing device comprising a hardware identification (HWID) thereof.

3. The system of claim 1 comprising at least one subsystem for obtaining information specific to the computing device comprising an install time of an operating system thereof.

4. The system of claim 1 comprising at least one subsystem for obtaining information specific to a current period of time, wherein the state store is stored according to a location that varies according to such current period of time.

5. The system of claim 1 comprising at least one subsystem for determining the specific number of locations as a number n of parts in which the state store is to be divided times a number m of copies of each part that are to be stored.

6. The system of claim 1 comprising at least one subsystem for generating the specific number of pseudo-random file names, each having a pseudo-random name length.

7. The system of claim 1 comprising at least one subsystem for generating the specific number of paths, each path comprising one of a plurality of levels of an operating system directory path on the computing device.

8. The system of claim 1 comprising at least one subsystem for generating the specific number of paths, each path comprising one of a plurality of levels of a registry path on the computing device.

9. The system of claim 1 wherein storing the state store according to the specific number of generated locations comprises:
    protecting the state store by performing at least one of:
    signing the state store to produce a signature and appending the signature to the state store; and
    encrypting the state store to produce an encrypted state store;
    dividing the state store into n parts;
    saving each of the n parts m times according to the specific number of formed locations, wherein the specific number=n times m.

10. The system of claim 1 wherein storing the state store according to the specific number of generated locations comprises:
    dividing the state store into n parts;
    protecting the state store by signing at least one of the n parts of the state store to produce a signature and appending the signature to the part; and
    saving each of the n parts according to the specific number of formed locations.

11. The system of claim 1 further comprising retrieving the stored state store, the retrieving comprising:
    obtaining the information unique to the computing device;
    determining the specific number of locations at which at least a portion of the state store is stored;
    generating the specific number of pseudo-random file names and the specific number of corresponding paths based at least in part on the obtained information;
    pairing the specific number of generated file names and the specific number of generated paths to form the specific number of locations; and retrieving the state store from the specific number of generated locations.

12. The system of claim 11 wherein the state store has been divided into n parts and each of the n parts has been saved according to the specific number of formed locations, and wherein retrieving the stored state further comprises:
   retrieving the n parts from the specific number of locations;
   reconstituting the state store from the retrieved n parts thereof;
   if the reconstituted state store is encrypted, decrypting same; and
   if the reconstituted state store is signed to produce a signature, verifying the signature.

13. The system of claim 12 wherein the state store has been divided into n parts and each of the n parts has been saved m times according to the specific number of formed locations, and wherein retrieving the stored state comprises reconstituting m copies of the state store from the retrieved n parts thereof, and further comprises randomly selecting one of the m reconstituted copies.

14. The system of claim 1 wherein each file name has a length and wherein generating the specific number of pseudo-random file names based at least in part on the obtained information comprises:
   hashing data including the obtained information to produce a first hash comprising a string of numbers;
   for each file name length, applying a pre-defined serial portion of the first hash to a function to result in the file name length; and
   for each Nth file name:
   performing a predetermined modification to an Nth hash;
   hashing the modified Nth hash to produce an (N+1)th hash comprising a string of numbers, wherein the first hash is employed to produce a second hash for a first file name, the second hash is employed to produce a third hash for a second name, etc.; and
   for each file name character of the Nth file name, applying a pre-defined serial portion of the (N+1)th hash to a function to result in the file name character.

15. The system of claim 14 wherein each file name length has a preset minimum and maximum, and wherein applying the pre-defined serial portion of the first hash to a function to result in the file name length comprises applying the pre-defined serial portion of the first hash to a modulo function:

Length=[serial portion mod(maximum−minimum)]+minimum.

16. The system of claim 14 wherein applying the pre-defined serial portion of the (N+1)th hash to a function to result in the file name character comprises applying the pre-defined serial portion of the first hash to a conversion table predefined for the computing device.

17. The system of claim 14 wherein the modification comprises at least one of a bit shift, a reverse ordering, and a swapping.

18. The system of claim 1 wherein each path comprises one of a plurality of levels of an operating system directory path on the computing device, and wherein generating the specific number of paths based at least in part on the obtained information comprises:
   hashing data including or based on the obtained information to produce a path hash comprising a string of numbers;
   for each path, applying a pre-defined serial portion of the path hash to a function to result in a level for the path.

19. The system of claim 18 wherein each path level has a preset minimum and maximum, and wherein applying the pre-defined serial portion of the path hash to a function to result in the level for the path comprises applying the pre-defined serial portion of the path hash to a modulo function:

Level=[serial portion value mod(maximum−minimum)]+minimum.

20. The system of claim 1 comprising defining successive periods of time, and for each successive period of time:
   obtaining information unique to the computing device;
   determining a specific number of locations at which at least a portion of the state store is to be stored at;
   generating the specific number of pseudo-random file names and specific number of corresponding paths based at least in part on the obtained information and based at least in part on indicia relevant to the period of time, wherein the generated file names and corresponding paths are unique to the computing device and unique to the period of time;
   pairing the specific number of generated file names and the specific number of generated paths to form the specific number of locations; and
   storing the state store according to the specific number of generated locations, wherein the state store is moved during each successive period of time.

21. The system of claim 1 further comprising at least one subsystem for:
   obtaining alternate information relevant to the computing device;
   generating at least one pseudo-random file name and at least one corresponding path based at least in part on the alternate information and pairing same to form at least one alternate location; and
   storing the obtained information as original information according to the at least one generated alternate location, wherein if the obtained information changes on the computing device, such changed information cannot be employed to retrieve the state store but the alternate information can be employed to retrieve the original information and the original information can be employed to retrieve the state store.

* * * * *